US009832085B1

(12) United States Patent
Malboubi

(10) Patent No.: US 9,832,085 B1
(45) Date of Patent: Nov. 28, 2017

(54) SYSTEM FOR ESTIMATING UNKNOWN ATTRIBUTES OF INTEREST IN THE UNDER-DETERMINED INVERSE PROBLEM AND A PROCESS OF ACCOMPLISHING THE SAME

(71) Applicant: Mehdi Malboubi, San Ramon, CA (US)

(72) Inventor: Mehdi Malboubi, San Ramon, CA (US)

(*) Notice: Subject to any disclaimer, the term of this patent is extended or adjusted under 35 U.S.C. 154(b) by 129 days.

(21) Appl. No.: 15/002,376

(22) Filed: Jan. 20, 2016

Related U.S. Application Data

(60) Provisional application No. 62/105,437, filed on Jan. 20, 2015.

(51) Int. Cl.
*H04L 12/26* (2006.01)

(52) U.S. Cl.
CPC ........ *H04L 43/045* (2013.01); *H04L 43/0829* (2013.01); *H04L 43/0852* (2013.01); *H04L 43/0888* (2013.01)

(58) Field of Classification Search
CPC .................................................. H04L 45/38
USPC .......................................................... 370/252
See application file for complete search history.

(56) References Cited

U.S. PATENT DOCUMENTS

| | | | | |
|---|---|---|---|---|
| 6,785,240 B1 * | 8/2004 | Cao | .................. | H04L 43/045 370/238 |
| 7,746,784 B2 * | 6/2010 | de Heer | .................. | G06F 9/505 370/229 |
| 7,836,201 B2 * | 11/2010 | Kotrla | .................. | H04L 41/0896 709/203 |
| 8,125,911 B2 * | 2/2012 | Patel | .................. | H04L 12/5691 370/241 |
| 8,248,925 B2 * | 8/2012 | Allan | .................. | H04L 45/00 370/229 |

(Continued)

OTHER PUBLICATIONS

M. Malboubi. L. Wang, C. Chuah, and P. Sharma, "Intelligent sdn based traffic (de)aggregation and measurement paradigm (istamp)," IEEE INFOCOM, 2014.

(Continued)

*Primary Examiner* — Guang Li
(74) *Attorney, Agent, or Firm* — Law Office of Michael O'Brien

(57) ABSTRACT

A method for solving an under-determined inverse problem or network inference/tomography problem in per-flow size, delay, loss and throughput inference in a computer network, through a system is presented. The method includes the following steps, which are not necessarily in order. First, establishing the computer network having a plurality of nodes wherein the per-flow size, the delay, the loss and the throughput inference are unknown. An original observation or routing matrix determines how flows are appeared on the links and construct the measurements. Next, performing a learning phase to obtain an optimal observation matrix or pseudo-optimal observation matrix. After that, performing a computer controller adaptive measurement and inference phase to estimate the set of unknowns using the measurement quantities, and a function of one of the set consisting of: the optimal observation matrix, the original observation matrix, or both.

15 Claims, 17 Drawing Sheets

(56) References Cited

U.S. PATENT DOCUMENTS

| | | | | |
|---|---|---|---|---|
| 8,711,676 | B2* | 4/2014 | Bhat | H04L 41/0668 370/216 |
| 9,083,627 | B2* | 7/2015 | Vasseur | H04L 45/125 |
| 9,641,452 | B2* | 5/2017 | Lu | H04L 47/788 |
| 9,646,253 | B2* | 5/2017 | Kankar | G06N 5/048 |
| 2007/0177506 | A1* | 8/2007 | Singer | H04L 45/38 370/235 |
| 2012/0127029 | A1* | 5/2012 | Rachlin | G01S 19/40 342/357.23 |
| 2012/0191843 | A1* | 7/2012 | Ding | G06F 11/3006 709/224 |
| 2013/0262661 | A1* | 10/2013 | Malboubi | H04L 41/142 709/224 |

OTHER PUBLICATIONS

M. Moshref, M. Yu, R. Govindan, and A. Vandat, "Dream: Dynamic resource allocation for software-defined measurement," ACM SIGCOMM (HozSDN), 2014.

A. Soule, K. Salamatian, and N. Taft, "Combining filtering and statistical methods for anomaly detection," ACM SIGCOMM, 2005.

M. Roughan, M. Thorup, and Y. Zhang, "Traffic engineering with estimated traffic matrices," ACM-IMC, 2003.

"Cisco netflow," At: http://en.wikipedia.org/wiki/Netflow.

"Sampled netflow," At: http://www.cisco.com/en/US/docs/ios/12\0s/feature/guide/12s\sanf.html.

A. Kumar and J. Xu, "Sketch guided sampling—using on-line estimates of flow size for adaptive data collection," in INFOCOM, 2006.

M. Roughan, "A case study of the accuracy of snmp measurements," JECE, vol. 2010, pp. 33:1-33:7, Jan. 2010.

A. Medina and et al., "Traffic matrix estimation:existing techniques and new directions," in ACM SIGCOMM, 2002.

R. M, Y. Zhang, W. Willinger, and L. Qiu, "Spatio-temporal compressive sensing and internet traffic matrices," IEEE/ACM Transactions on Networking, vol. 20, pp. 662-676, 2012.

Q. Zhao, Z. Ge, J. Wang, and J. Xu, "Robust traffic matrix estimation with imperfect information: Making use of multiple data sources," ACM-SIGMETRICS, 2006.

J. Cao, D. Davis, S. Wiel, and B. Yu, "Time varying network tomography: Router link data," JNL of American Stat. Association, 2000.

G. Huang, A. Lall, C.-N. Chuah, and J. Xu, "Uncovering global icebergs in distributed streams: Results and implications," J. Network Syst. Manage, vol. 19, No. 1, pp. 84-110, 2011.

A. Tootoonchian, M. Ghobadi, and Y. Ganjali, "Opentm: traffic matrix estimator for openfiow networks," 2010.

N. van Adrichen, C. Doerr, and F. Kuipers, "OpenNetMon: Network monitoring in openflow sdn networks," IEEE, INFOCOM, 2014.

M. Yu, L. Jose, and R. Miao. "Software defined traffic measurement with opensketch," ACM-USENIX, 2013.

L. Jose. M. Yu, and J. Rexford, "Online measurement of large traffic aggregates on commodity switches," ACM-Hot-ICE, 2011.

M. C. A.P. Lakhina. E. K. C.M. Diot, and N. Taft, "Structural analysis of network traffic flows," ACM Sigmetrics, 2004.

A. Israel and T. E Greville in Generalized Inverses: Theory and Applications, Springer, 2003.

H. Nguyen and P. Thiran, "Network loss inference with second order statistics of end-to-end flows," ACM-IMC, 2007.

M. Basseville and I. Nikiforov in Detection of Abrupt Changes: Theory and Application, Prentice-Hall, 1993.

"Geant network:." http://totem.info.ucl.ac.be/dataset.html.

"Miniet," At: http://mininet.org/.

* cited by examiner

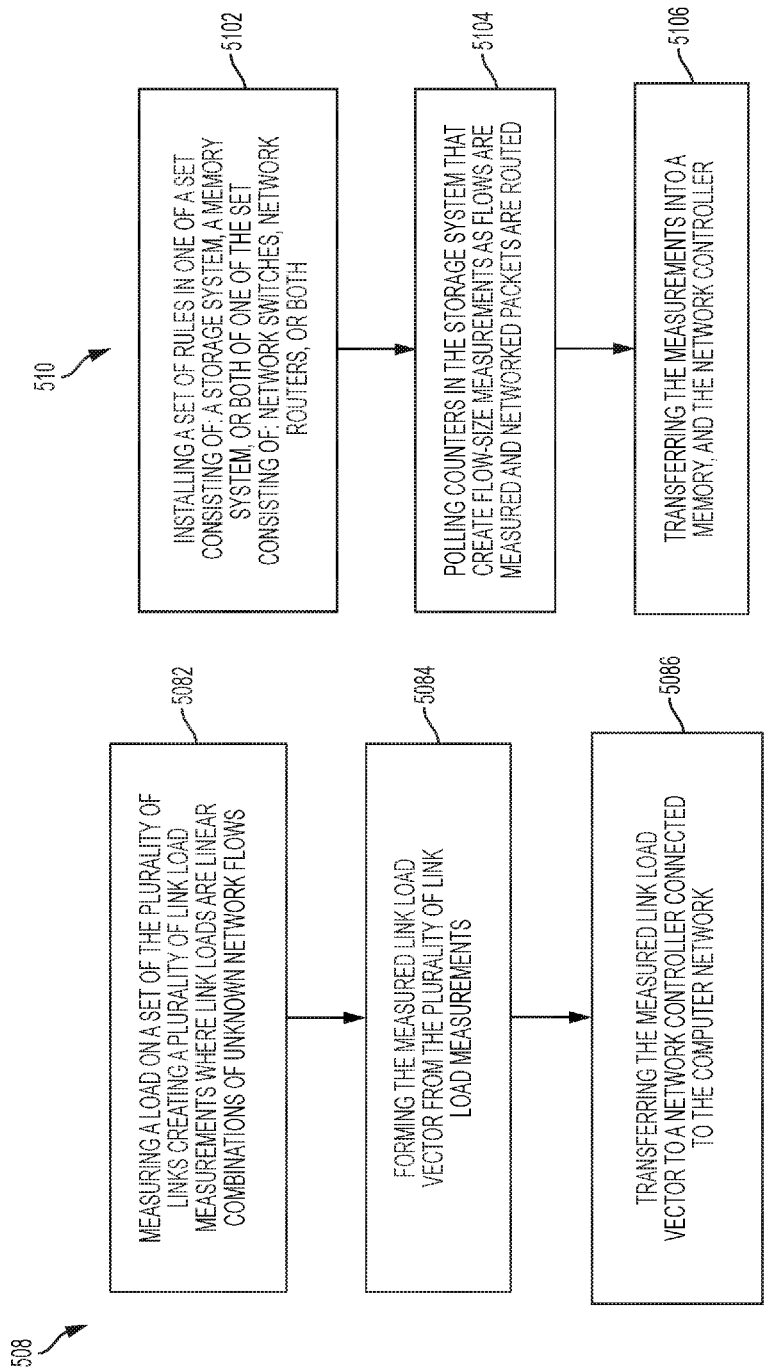

SYSTEM FOR ESTIMATING UNKNOWN ATTRIBUTES OF INTEREST IN THE UNDER-DETERMINED INVERSE PROBLEM AND A PROCESS OF ACCOMPLISHING THE SAME

RELATED APPLICATION

This application claims priority to provisional patent application U.S. Ser. No. 62/105,437 filed on Jan. 20, 2015, the entire contents of which is herein incorporated by reference.

BACKGROUND

The embodiments herein relate generally to systems that control flow in systems.

Prior to embodiments of the disclosed invention there was no efficient way to solve an under-determined inverse problem. As a result, there was no way to produce optimized flows in an underdetermined system. Embodiments of the disclosed invention solve this problem.

SUMMARY

A method for solving an under-determined inverse problem or network inference/tomography problem in per-flow size, delay, loss and throughput inference in a computer network, through a system given an original observation matrix, includes the following steps, which are not necessarily in order. First, establishing the computer network having a plurality of nodes wherein the per-flow size, the delay, the loss and the throughput inferences are unknown; wherein an original routing matrix determines how flows from each node to every other node are appeared on links. Next, performing a learning phase by first measuring a set of quantities which are combinations of unknowns creating a first set of measurements. Then, measuring at least some of a set of unknowns creating a second set of measurements. After that, using the first set of measurements and the second set of measurements, an optimal observation matrix or pseudo-optimal observation matrix is computed. Following that, performing a computer controller adaptive measurement and inference phase by first measuring the set of quantities which are the combinations of the unknowns creating measurement quantities. Then, identifying a partial set of most informative unknown network flows that must be re-measured and updated. After that, re-measuring a partial set of unknowns. Next, re-computing and updating the optimal observation matrix to form an updated optimal observation matrix. Following that, estimating the set of unknowns using the measurement quantities, and a function of one of the set consisting of: the optimal observation matrix, the original observation matrix, or both.

In some embodiments the method can include determining a starting time of the learning phase and a duration of the learning phase by detecting sequential significant changes in measurements during the adaptive measurement and inference phase. Then, determining a set of most informative unknown network flows using at least one learning algorithm; wherein the at least one learning algorithm includes a multi-bandit algorithm.

In some embodiments, the method can include generating the optimal observation matrix with a regularized or non-regularized optimization technique including a least square estimation technique with or without constraints.

In some embodiments, the under-determined inverse problem is a traffic matrix estimation problem and a set of unknown network flows are estimated by first, measuring SNMP link loads as measured quantities which are linear combinations of a size of unknown network flows. Then, measuring a partial set of unknown network flow sizes using counters associated with one of the set consisting of: flow-table entries, TCAM entries or both. Next, computing the optimal observation matrix as a replacement of the original routing matrix. After that, inferring a set of unknown flows using SNMP link load measurements, and using specific estimation techniques that can include a function of one of the set consisting of the optimal observation matrix, the original routing matrix, or both.

A method for determining a size of network flows in a computer network through a system that can include the following steps which are not necessarily in order. First, providing a network having a plurality of nodes connected by a plurality of links, wherein nodes denote network devices and/or elements including computer hosts, physical switches, physical routers, virtual switches, and virtual routers. Next, performing a learning phase by iteratively performing the following steps until all link loads and a set of unknown network flow sizes have been measured, and an optimal observation matrix is computed. First, creating a measured link load vector by performing, first, measuring a load on a set of the plurality of links creating a plurality of link load measurements where link loads are linear combinations of a set of unknown network flows. Then, forming the measured link load vector from the plurality of link load measurements. After that, transferring the measured link load vector to a network controller connected to the computer network. Following that, creating a vector representation of a measured traffic matrix by measuring and storing a size of a flow from each node to every other node for a specified time period, by performing the following steps. First, installing a set of rules in one of a set consisting of: a storage system, a memory system, or both of one of the set consisting of: physical/virtual network switches, physical/virtual network routers, or both. Next, polling counters in the storage system that create flow-size measurements as flows are measured and network packets are routed. After that, transferring the measurements into a memory, and the network controller. Following that, forming the optimal observation matrix by taking a matrix multiplication of the measured link load vector, a transpose of the vector representation of the measured traffic matrix, and a pseudo inverse of the matrix multiplication of the vector representation of the measured traffic matrix and the transpose of the vector representation of the measured traffic matrix.

In some embodiments this method can include, performing an adaptive measurement and inference phase by iteratively and adaptively performing the following steps until adjusted link loads are measured, a set of most informative unknown network flows to be re-measured and updated is identified, the set of most informative unknown network flows are measured and the vector representation of a traffic matrix is updated to form an adjusted vector representation of the traffic matrix, an adjusted optimal observation matrix is computed, and an unknown vector representation of the traffic matrix is estimated. The steps include: first, establishing an iteration time. Next, starting a timer. After that, for a timer value less than the iteration time, performing the following steps. First, creating an adjusted link load vector by performing the following steps. First, measuring an adjusted load on the set of the plurality of links creating a plurality of adjusted link load measurements. Next, forming the adjusted link load vector from the plurality of adjusted link load measurements. After that transferring the adjusted link load vector to the network controller. Following that, creating the adjusted vector representation of the traffic matrix by storing and updating an adjusted size of the flow from a set of nodes to another set of nodes identified by the set of most informative unknown network flows by identifying the set of most informative unknown network flows that must be re-measured and updated. Then, installing an adjusted set of rules, for measuring identified most informative flows, in one of a set consisting of: the storage system, the memory system, or both of one of the set consisting of: the network switches, the network routers, or both. In some embodiments, the network switches can be either physical switches, virtual switches or both. In some embodiments, the network routers can be either physical routers, virtual routers or both. After that, polling adjusted counters in the one of a set consisting of: the storage system and the memory system that create adjusted measurements of the most informative flows as adjusted flows are measured and the network packets are routed. Following that, transferring the adjusted measurements into the memory and the network controller. Then, forming the adjusted vector representation of the traffic matrix by updating the size of the most informative flows. Following that, forming the adjusted optimal observation matrix by taking the matrix multiplication of the adjusted link load vector, the transpose of the adjusted vector representation of the traffic matrix, and the pseudo inverse of the matrix multiplication of the adjusted vector representation of the traffic matrix and the transpose of the adjusted vector representation of the traffic matrix. After that, creating an estimation of the vector representation of the traffic matrix by taking the matrix multiplication of the pseudo inverse of the adjusted optimal observation matrix and the adjusted link load vector.

In some embodiments, this method can include, detecting a significant change in the measurements. Then, restarting the learning phase. Finally, identifying the set of the most informative flows by finding a set of flows which maximize an angle between a current SNMP link-load vector and a SNMP link-load vector at a time of the significant change. In some embodiments, the storage system can be one of the set consisting of: TCAM, flow-table entries, or both. The network controller can be connected to switches and routers on the network through one of the set consisting of: a secure channel, a protocol, or both.

In some embodiments, an under-determined inverse problem is an inverse problem wherein the number of measurements is less than the number of unknowns that must be estimated. An over-determined inverse problem is the inverse problem wherein the number of measurements is larger than the number of unknowns that must be estimated. A square inverse problem is an inverse problem wherein the number of measurements is equal to the number of unknowns that must be estimated.

BRIEF DESCRIPTION OF THE FIGURES

The detailed description of some embodiments of the invention is made below with reference to the accompanying figures, wherein like numerals represent corresponding parts of the figures.

FIG. 5D shows a schematic view of one embodiment of the present invention;

FIG. 5E shows a schematic view of one embodiment of the present invention;

DETAILED DESCRIPTION OF CERTAIN EMBODIMENTS

Figure 1:
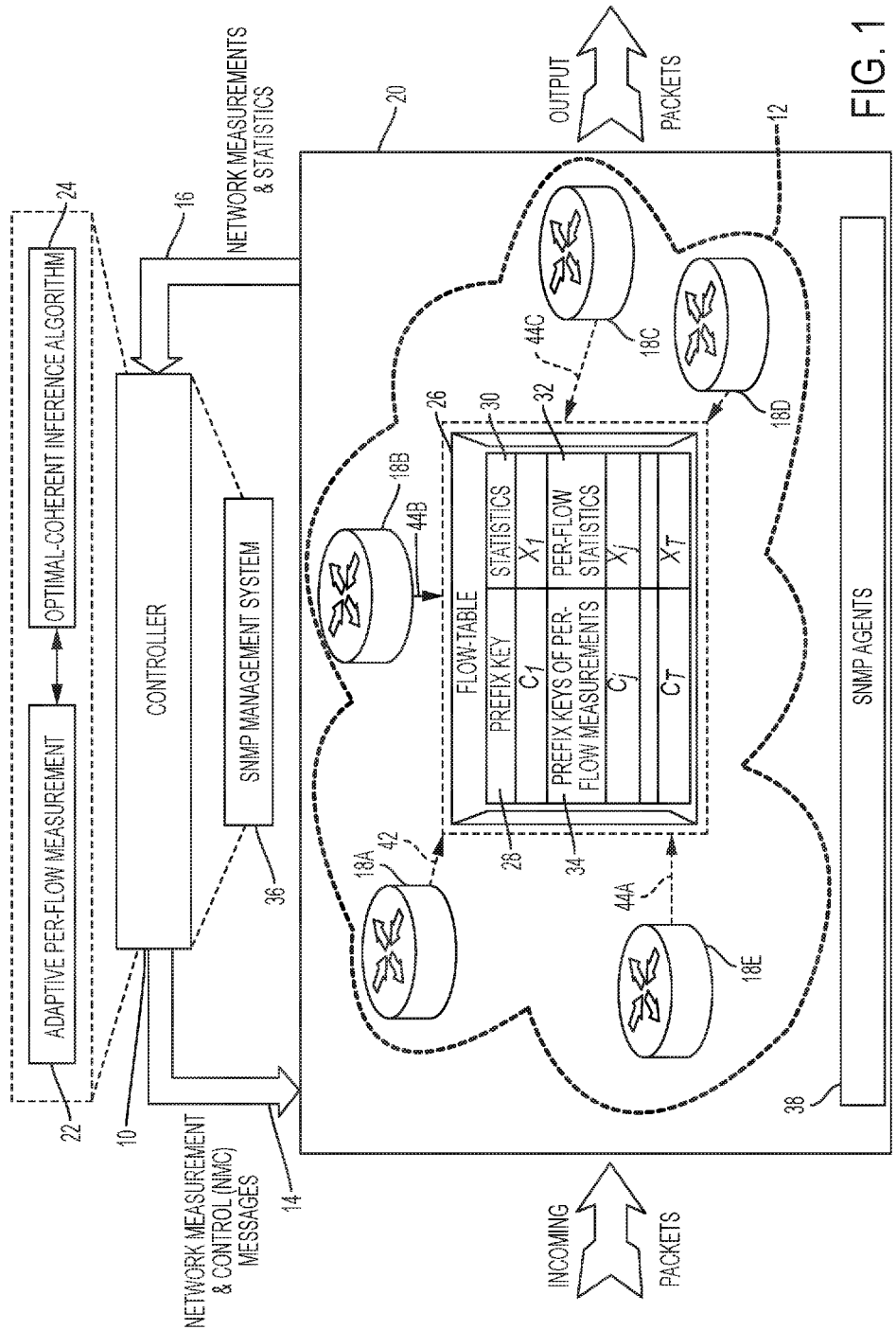
FIG. 1 shows a schematic view of one embodiment of the present invention.

By way of example, and referring to FIG. 1, a controller 10 is communicatively coupled to an operating network 20 using a network communication system including network measurement controlling messages 14. Operating network 20 further comprises software defined network devices and non-software defined network devices. Network measurement controlling messages 14 can dynamically configure or reconfigure the software defined measurement network 12 as well as poll required network measurements and statistics 16. Operating network 20 and software defined measurement network 12 further comprise a plurality of network devices and elements including open flow switches 18, and simple network management protocol (SNMP) agents. Controller 10, which can either be a physical component or a virtualized controller, further comprises SNMP management system 36 and network configuration protocol. Software defined measurement network 12 further comprises a plurality of open flow switches 18A, 18B, 18C, 18D, and 18E in an operating network 20. The plurality of open flow switches 18A, 18B, 18C, 18D, and 18E are either mainly or partially for network traffic measurement and network packet forwarding and routing. In some embodiments, the plurality of open flow switches can be one of the set consisting of physical switches, virtual switches or both. Controller 10 further comprises an adaptive per flow measurement module 22 and an optimal-coherent inference module 24. The adaptive per flow measurement module 22 indicates the set of most informative flows 44 in the operating network 20 that can be directly measured. The optimal-coherent inference module 24 processes the measurements and statistics 16 and provides accurate estimates of network flows 42. The controller 10, then sends network measurement controlling messages 14 to the software defined measurement network 12. In some embodiments, required per flow measurements 32 and aggregated flow measurements 32 are measured by NetFlow protocol, sFlow protocol, and probing packets.

The network measurement controlling messages 14 indicate which flow in the operating network 20 should be directly measured at different times or locations by re-configuring either a ternary content addressable memory 26, a flow table or both. The ternary content addressable memory 26 (TCAM) models the TCAM entries of the plurality of open flow switches 18A, 18B, 18C, 18D, and 18E. The flexibility of open flow is used to install TCAM wildcard matching rules or prefix keys 28 and collect associated statistics 30. Associated statistics 30 can include per flow measurements 32 or aggregated measurement of multiple flows in each measurement interval 40. The longest prefix matching forwarding table mechanism in open flow switches 18 facilitates the implementation of a per-flow measurement process where prefix keys 28 of the per-flow measurements 34 are stored in the ternary content addressable memory 26 or flow tables and corresponding counters measure the size of flows. This process is called de-aggregation.

In some embodiments, controller 10 further comprises a SNMP management system 36, alternately, SNMP management system 36 is communicatively coupled to controller 10. Network measurement controlling messages 14 are a mean of the interaction of the Simple Network Management Protocol (SNMP) management system 36 and SNMP agents 38 to measure SNMP link-loads. In some embodiments, controller 10 and SNMP management system 36 are collocated in one machine and in other embodiments, they are located in separate machines and they can poll the statistic counts periodically or in different measurement intervals the frequency of which is limited by practical constraints. Regardless, a focus is on traffic matrix 52 measurement and inference where ternary content addressable memory 26 entries of all of the open flow switches 18 of the software defined measurement network 12 is modeled as a large flow table.

Figure 2:
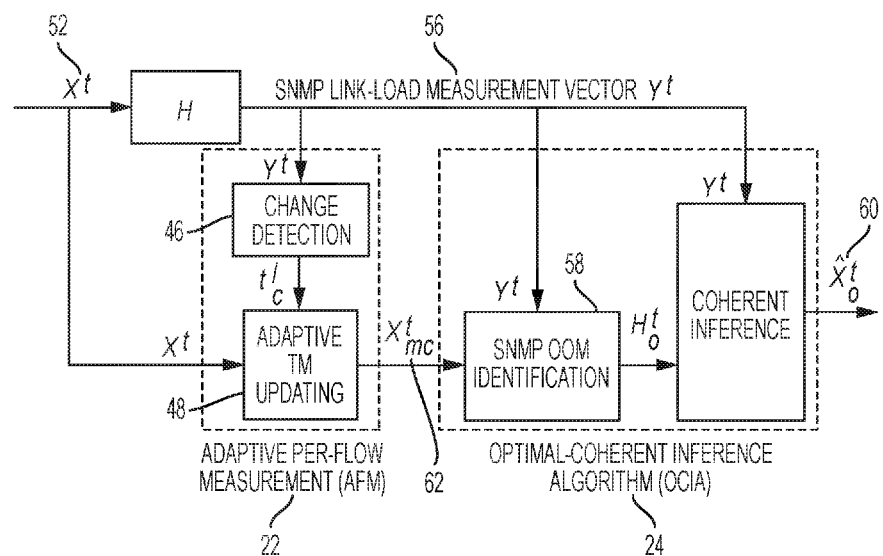
FIG. 2 shows a schematic view of one embodiment of the present invention.

FIG. 2 shows another view of operating network 20. At each measurement interval 40 or $\tau$ there are m SNMP link load measurements defined by the vector $Y_{m \times 1}^{t} := \{y_i^t\}_{i=1}^{m}$ and $n=N(N-1)$ flows which form the vector representation of traffic matrix 52, here $X_{n \times 1}^{t} := \{x_j^t\}_{j=1}^{n}$. The SNMP link load vector 56 or $Y^t$ is linearly related to the traffic matrix 52, here $X^t$ as $Y^t = HX^t$ where $j^{th}$ 1 in $i^{th}$ row of the binary routing matrix H represents the contribution of the $j^{th}$ flow $x_j^t$ in the $i^{th}$ link load $y_i^t$. If H is not binary, then $j^{th}$ value in $i^{th}$ row of matrix H represents the contribution of the $j^{th}$ attribute $x_j^t$ in the $i^{th}$ quantity $y_i^t$. The set of origin-destination flows in network exhibit a constant behavior in the sense that the dynamic of network flows 42 are predictive over time intervals with different durations, called as coherence time. The notion of coherence time is the time interval within which network flows 42 demonstrate, on average, a consistent and predictable behavior. Additionally, coherence time is defined as the time between the occurrences of two consecutive major changes in the behavior of the traffic matrix 52 which is quantified by an appropriate metric.

Figure 3:
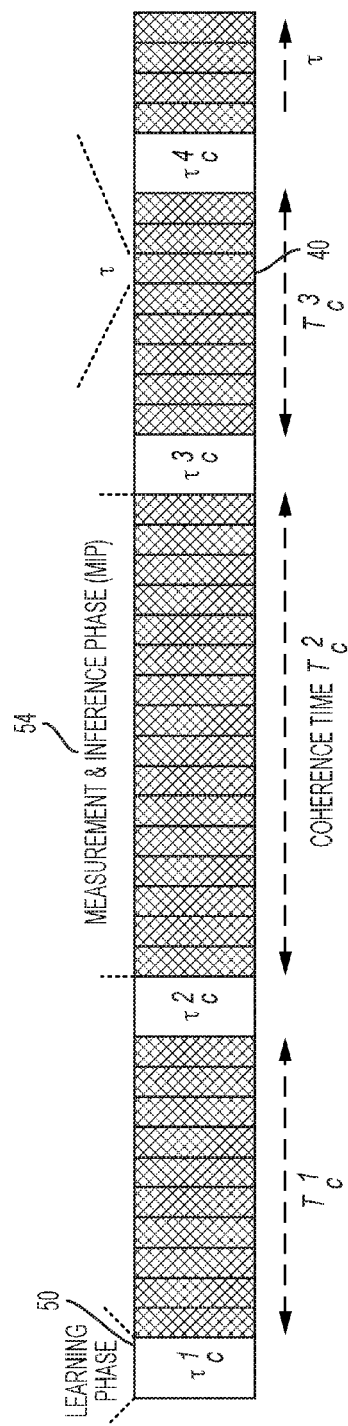
FIG. 3 shows a schematic view of one embodiment of the present invention.

FIG. 3 represents the behavior of a network flow over multiple coherence times in the software defined measurement network 12. Change time $t_c^l$ indicates the time of the $l^{th}$ major change in the network traffic and the $l^{th}$ coherence time is the interval between $1^{th}$ and $(l+1)^{th}$ major change times in network flows 42. That is, $T_c^l = \{t_c^l + 1, \ldots, t_c^{l+1} - 1\}$.

Controller 10 assumes that at the $t^{th}$ measurement interval 40 with measurement interval 40, two sets of network measurements are provided. First the SNMP management system 36 interacts with SNMP agents 38 and provides the SNMP link load measurements $Y^t$. Second, under hard resource constraint of the size of ternary content addressable memory 26 in flow tables of open flow switches 18A, 18B, 18C, 18E where the sum of all ternary content addressable memories in switches T<<n, all T entries in ternary content addressable memory 26 are used to track and measure all flows and/or the set of most informative flows 44A, 44B and 44C and to provide T per flow measurements 32.

Returning to FIG. 2, adaptive per flow measurement module 22 comprises two methods: change detection method 46 and adaptive traffic matrix updating method 48. At a first measurement interval 40 in the beginning of the learning phase 50, a first SNMP link-load vector $Y^{t_c^l}$ is created. At $t^{th}$ measurement interval 40, a second SNMP link-load vector $Y^t$ is created. Additionally, the SNMP link-load vector $Y^t$ is compared with the first SNMP link-load vector $Y^{t_c^l}$ with change detection method 46. The detection of the $l^{th}$ significant change in $Y^t$s indicates the beginning of a new coherence time and the beginning of a learning phase 50. At the new coherence time $t_c^l$, a learning phase 50 begins. In a learning phase 50, all available T entries of the ternary content addressable memory 26 in the software defined measurement network 12 are used to measure the most current traffic matrix 62. In a computer controlled measurement and inference phase 54, that is, over $l^{th}$ coherence time $T_c^l$, the T most informative flows 44A, 44B and 44C are directly measured and T flows 42 are updated in the most current traffic matrix 62.

Controller 10 further utilizes the optimal-coherent inference module 24. Optimal-coherent inference module 24 uses the most current traffic matrix 62 and the SNMP link load vector 56 to identify an optimal observation matrix 58 of SNMP link load vectors 56, denoted by $H_O^t$. At each measurement interval 40, the per flow measurements 32 and the SNMP link-loads are used to coherently estimate the traffic matrix 60 or $\hat{X}_O^t$ (equivalently $\hat{W}_O^t$) using the following optimization formulation represented in the equation below where $X_{\tau 0^t}^t$ denotes the set of directly measured per-flow counts, $$X_{\tau 0^t}^t$$

denotes the set of flows that must be estimated, and $$X^t = X_{\tau 0^t}^t \cup X_{\overline{\tau 0^t}}^t.$$

$$\hat{W}_O^t = \min_{X_{\overline{\tau 0^t}}^t} \| X_{\overline{\tau 0^t}}^t \|_2$$

s.t. $X_{\tau 0^t}^t$ is known and $Y^t = H_O^t X^t$ and $X_{\tau 0^t}^t \cap X_{\overline{\tau 0^t}}^t \neq \emptyset$ Under hard constraints of limited resources in software defined measurement network 12 this framework is simple, flexible and efficient with very high estimation accuracy which can be deployed on the plurality of open flow switches 18A, 18B, 18C, 18D, and 18E. Moreover, the communication overhead between controller 10, and the plurality of open flow switches 18A, 18B, 18C, 18D, and 18E is low because the required measurements for the fine-grained estimation of network flows 42 are aggregated SNMP link loads which are readily and reliably available in ISP networks. Further, only a few most beneficial flows are required to be directly measured.

Figure 4:
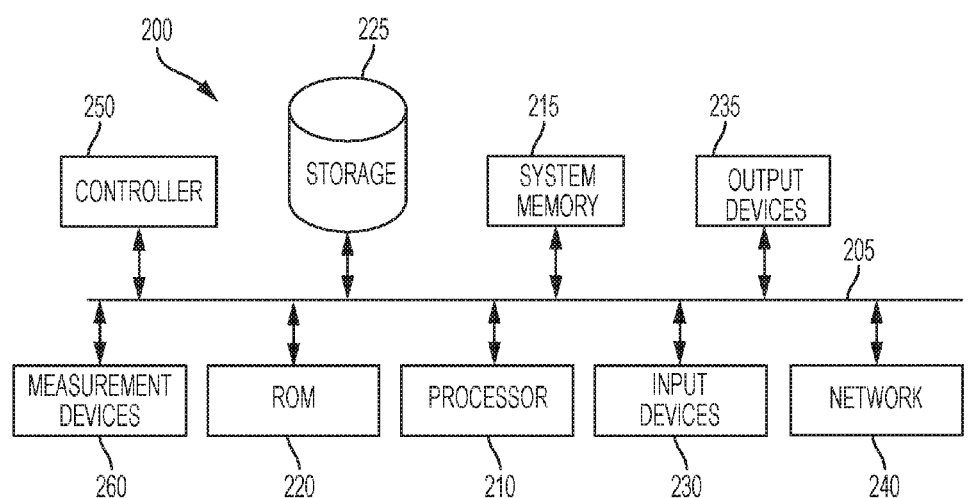
FIG. 4 shows a schematic view of one embodiment of the present invention.

FIG. 4 conceptually illustrates an electronic system 200 with which some embodiments of the invention are implemented. The electronic system 200 may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, a network 240, a controller 250, and measurement devices 260.

The bus 205 collectively represents all system, peripheral, and chipset buses that communicatively connect the numerous internal devices of the electronic system 200. For instance, the bus 205 communicatively connects the processing unit(s) 210 with the read-only 220, the system memory 215, and the permanent storage device 225.

From these various memory units, the processing unit(s) 210 retrieves instructions to execute and data to process in order to execute the processes of the invention. The processing unit(s) may be a single processor or a multi-core processor in different embodiments.

The read-only-memory (ROM) 220 stores static data and instructions that are needed by the processing unit(s) 210 and other modules of the electronic system. The permanent storage device 225, on the other hand, is a read-and-write memory device. This device is a non-volatile memory unit that stores instructions and data even when the electronic system 200 is off. Some embodiments of the invention use a mass-storage device (such as a magnetic or optical disk and its corresponding disk drive) as the permanent storage device 225.

Other embodiments use a removable storage device (such as a floppy disk or a flash drive) as the permanent storage device 225. Like the permanent storage device 225, the system memory 215 is a read-and-write memory device. However, unlike storage device 225, the system memory 215 is a volatile read-and-write memory, such as a random access memory. The system memory 215 stores some of the instructions and data that the processor needs at runtime. In some embodiments, the invention's processes are stored in the system memory 215, the permanent storage device 225, and/or the read-only 220. For example, the various memory units include instructions for processing appearance alterations of displayable characters in accordance with some embodiments. From these various memory units, the processing unit(s) 210 retrieves instructions to execute and data to process in order to execute the processes of some embodiments.

The bus 205 also connects to the input and output devices 230 and 235. The input devices enable the person to communicate information and select commands to the electronic system. The input devices 230 include alphanumeric keyboards and pointing devices (also called "cursor control devices"). The output devices 235 display images generated by the electronic system 200. The output devices 235 include printers and display devices, such as cathode ray tubes (CRT) or liquid crystal displays (LCD). Some embodiments include devices such as a touchscreen that functions as both input and output devices.

Bus 205 also couples electronic system 200 to a network 240 through a network adapter (not shown). In this manner, the computer can be a part of a communications network, or a network of computers (such as a local area network ("LAN"), a wide area network ("WAN"), or an intranet), or a network of networks (such as the Internet). Any or all components of electronic system 200 may be used in conjunction with the invention.

Bus 205 couples electronic system 200 to controller 250 and measurement devices 260. In some embodiments controller 250 can adaptively determine a set of required quantities and unknowns of interest that must be measured at important instances of time. Measurement devices 260 can be used to measure a set of required quantities and unknowns of interest.

These functions described above can be implemented in digital electronic circuitry, in computer software, firmware or hardware. The techniques can be implemented using one or more computer program products. Programmable processors and computers can be packaged or included in mobile devices or embedded systems. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Optimal-coherent inference module 24 contains the following steps. First, at the $l^{th}$ time change $t_c^l$, the optimal observation matrix 58 of SNMP link load vectors 56 is identified as $H_O^{t_c^l}$. This can be done by first pooling the SNMP link load vectors 56 at $t=t_c^l$ using SNMP management system 36 and measuring the most current traffic matrix 62 at $t=t_c^l$. Next, a minimum norms solution is computed using the optimal observation matrix 58 for $t=t_c^l+1:1:t_c^{l+1}-1$. Both of these stages involve underdetermined inverse problems because all m×n elements of the optimal observation matrix 58 must be measured using m+n measurements of SNMP link load vector 56 and traffic matrix 52 at $t=t_c^l$ and m+n<m×n. In the second stage, m per-flow measurements 32 is less than n flows 42.

In Stage 1: $H_o^t = \underset{H^t}{\operatorname{argmin}} \|Y^t - H^t X^t\|_2^2$ at $t = t_c^l$ In Stage 2: $\hat{W}_O^t = \underset{X^t}{\operatorname{argmin}} \|X^t\|_2$ s.t. $Y^t = H^t X^t$ for $t \in = T_c^l$ In Stage 3: $\hat{W}_O^t = H_o^{t\dagger} Y^t$ where $H_o^{t\dagger} := (H_o^{t^T}(H_o^t H_o^{t^T})^{-1})$ Where † indicates the pseudo-inverse operator, T indicates the complex conjugate transpose of the matrix, and $\hat{W}_O^t$ denotes the estimate of the vector representation of the traffic matrix 52 or $X^t$ at time t.

The optimal observation matrix 58 in Stage 1 can be computed as $H_o^t = Y^t X^{t^T}(X^t X^{t^T})^\dagger$. In some embodiments, the general form of optimal observation matrix 58 or $H_o^t$ can be used as $H_{G^o}^t = (Y^t X^{t^T}(X^t X^{t^T})^\dagger + QX^\perp)$ where Q is an arbitrary m×m matrix and $X^\perp$ is the space of the rows perpendicular to $X^t$. The inverse or pseudo-inverse of a matrix can be computed using different techniques including the singular value decomposition method.

In the learning phase, Minimum norm estimations using $H_o^t = Y^t X^{t^T}(X^t X^{t^T})^\dagger$ has several properties. First, estimations are identifiable, that is, $\hat{W}_O^t = (H_o^t)^\dagger Y^t = X^t$. Second, measurements are compatible, that is, $Y^t = H_o^t X^t$. Third, estimations are noise immune because even if measurement vector $Y^t$ is noisy, then $\hat{W}_O^t = (H_o^t)^\dagger Y^t = X^t$.

In some embodiments, $\hat{W}_O^t$ can be computed using both the original observation matrix H and the optimal observation matrix 58 or $H_o^t$, including the minimum-norm estimation technique as follows:

$$\hat{W}_O^t = \left( \begin{bmatrix} H \\ H_o^t \end{bmatrix} \right)^\dagger \begin{bmatrix} Y^t \\ Y^t \end{bmatrix}.$$

In some embodiments, optimal-coherent inference module 24 can be alternately computed using regularized estimation techniques including the minimization of the addition of $\|Y^t - H^t X^t\|$ and a fraction of $\|H^t\|$. The unknown in this minimization problem that must be estimated is $H^t$, and operator norm $\|.\|$ is appropriately defined based on the application.

In some embodiments, computing the optimal observation matrix 506 can alternately include the following steps. Given a set of original observations, a set of new measurements is provided by designing the optimal observation matrix 506 which provides a set of most informative measurements to the set of given observations. This set of new observations is complementary to the set of given original observations and tries to minimize the estimation error as much as possible. For the application in network inference, let $Y_{SS}$ be a set of $T_{SS}$ vectors of original given link-loads $Y^t$ where $Y^t$ is an m×1 vector for $t=1, \ldots, T_{SS}$. At each time interval t, $Y^t = HX^t$ where H is the original routing matrix with size m×n, and $X^t$ is the vector representation of the traffic matrix 52. $X^t$ is assumed to be known over $T_{SS}$ periods of time $t=1, \ldots, T_{SS}$ in the learning phase 50. Then, a row of the optimal observation matrix 58 or $H_{On}$ with n columns can be designed by maximizing distance $d_d^2$, defined in the equation below:

$$h_{on} = \underset{h_{on}}{\operatorname{argmax}} d_d^2 =$$

$$\underset{h_{on}}{\operatorname{argmax}} (h_i X^t - h_{on} X^t)^2 \text{ for } i \in \{1, \ldots, m\} \text{ and } t \in \{1, \ldots, T_{SS}\}$$

Here, $h_i$ denotes the $i^{th}$ row of matrix H, $X^t$ denotes the $t^{th}$ vector representation of the traffic matrix 52, and $h_{on}$ denotes a row of matrix $H_{On}$. This maximization can be performed, in an iterative way, using the least square estimation approach, including the Least Mean Squares (LMS) algorithm, defined in the equation below:

$$h_{on}(j+1) = h_{on}(j) - 2\mu d X^{t^T}$$

Here, there is iteration over parameter j until convergence. $X^{t^T}$ is the complex conjugate transpose of $X^t$. μ is set to a small positive real number less than one. $h_{on}$ is normalized by its norm $\|h_{on}\|$ at each iteration j. Accordingly, by designing $m_1$ rows, an optimal observation matrix 58 or $H_{On}$ with size $m_1 \times n$ can be designed. A function of $H_{On}$, denoted by $H_{On}^f$, can be used to collect a new set of measurements $Y_n^t = H_{On}^f X^t$ where $X^t$ is the unknown vector representation of the traffic matrix 52 for $t > T_{SS}$. An estimate of $X^t$, can be inferred by computing the matrix multiplication of the pseudo-inverse of $H_{On}^f$ and $Y_n^t$.

This process can include the following steps of learning phase 50. First, measuring a set of vector of quantities, which are combinations of unknowns, over several period of times and creating a first set of measurements. Next, measuring a set of vector of unknowns over several period of times and creating a second set of measurements. Finally, computing one of the set consisting of an optimal observation matrix 506 and pseudo-optimal observation matrix by using the first set of measurements and the second set of measurements, and the least square estimation approach, including the Least Mean Squares (LMS) algorithm.

Figure 5B:
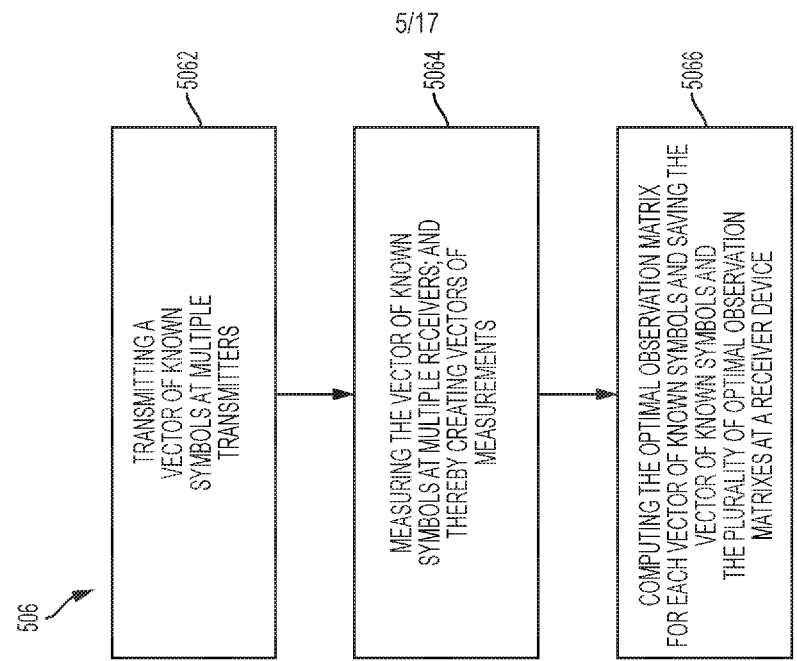
FIG. 5B shows a schematic view of one embodiment of the present invention.
Figure 5A:
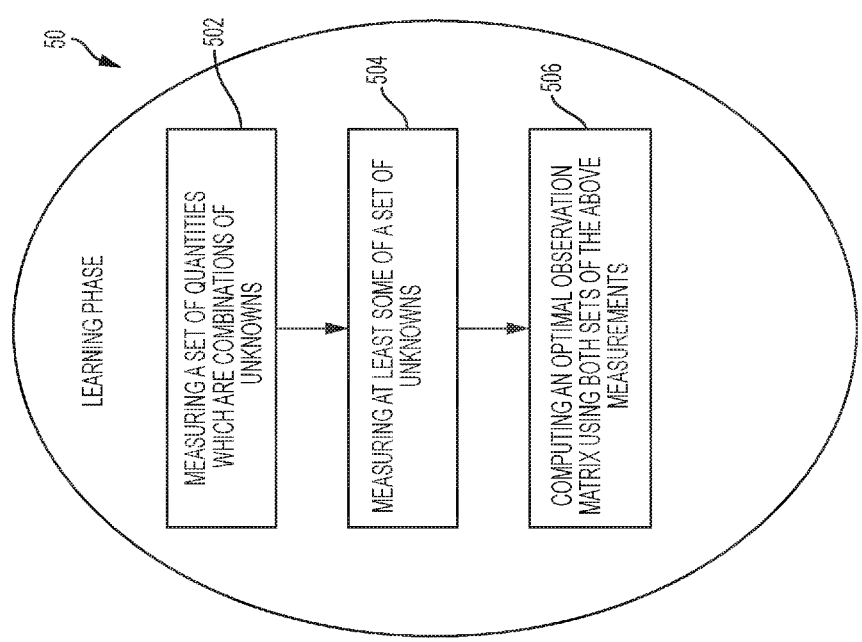
FIG. 5A shows a schematic view of one embodiment of the present invention.

FIG. 5A shows one embodiment of learning phase 50 in more detail. Learning phase 50 comprises the following steps, which are not necessarily in order. First, at step 502, measuring a set of quantities which are combinations of unknowns creating a first set of measurements. Next, at step 504, measuring at least some of a set of unknowns creating a second set of measurements. After that, at step 506, using the first set of measurements and the second set of measurements to form the optimal observation matrix 58 or pseudo-optimal observation matrix. In some embodiments, this can be done with a regularized optimization technique including a least square estimation technique with constraints. The regularized optimization technique can include the least square estimation technique without the constraints. Alternately, this can be done with a non-regularized optimization technique including a least square estimation technique with constraints. The non-regularized optimization technique can include the least square estimation technique without the constraints. Additional combinations of these can exist.

Turning to FIG. 5B, in some applications such as an under-determined multiple-input multiple output (MIMO) communication system, step 506 can be shown in more detail. In the learning phase 50, for all possible vectors of communication symbols, the optimal observation matrix 58 can be computed as follows. First, at step 5062, transmitting a vector of known symbols at multiple transmitters. Next, at step 5064, measuring the vector of known symbols at multiple receivers, and thereby creating vectors of measurements. After that, at step 5066, computing the optimal observation matrix 58 for each vector of known symbols creating a plurality of optimal observation matrixes 58.

Finally, saving the vector of known symbols and the plurality of optimal observation matrix 58 at a receiver device.

Figure 5C:
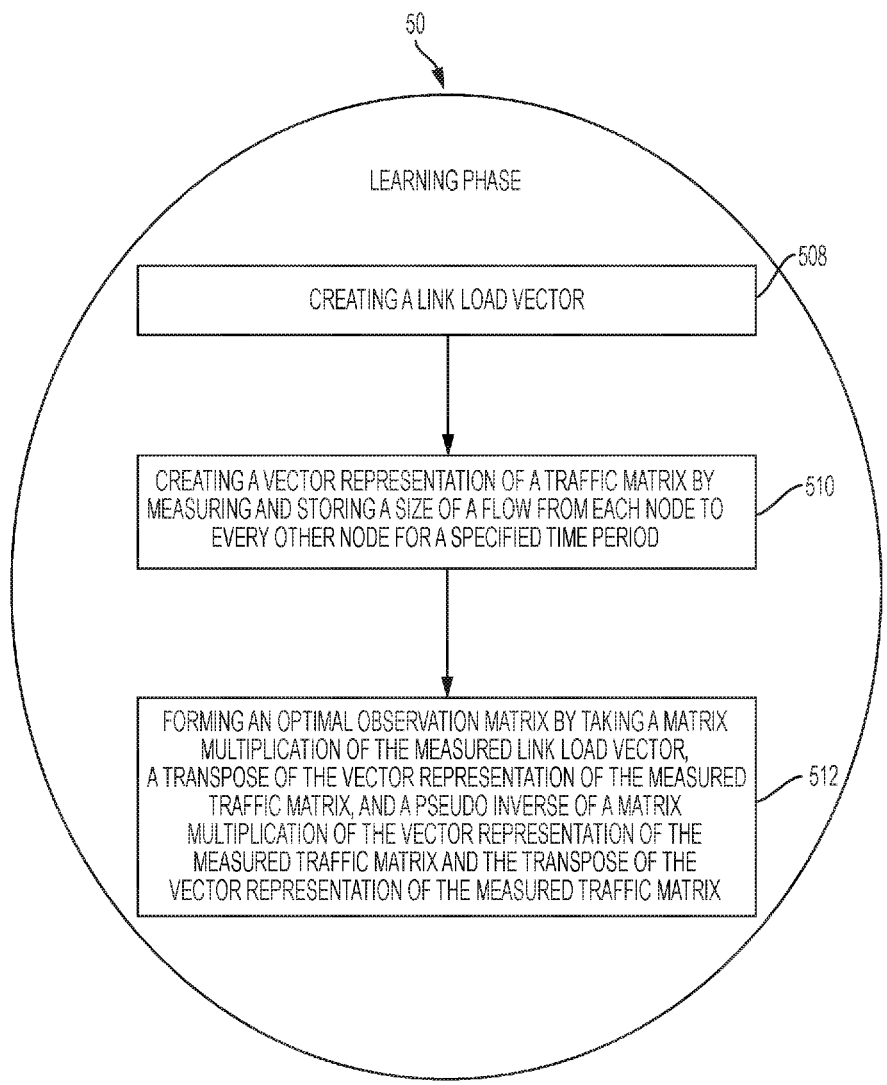
FIG. 5C shows a schematic view of one embodiment of the present invention.

Turning to FIG. 5C, learning phase 50 can be completed by performing the following steps. First, at step 508, creating a measured link load vector. Then, at step 510, creating a vector representation of a measured traffic matrix 52 by measuring and storing a size of a flow from each node to every other node for a specified time period. After that, at step 512, forming the optimal observation matrix 58 by taking a matrix multiplication of the measured link load vector, a transpose of the vector representation of the measured traffic matrix 52, and a pseudo inverse of the matrix multiplication of the vector representation of the measured traffic matrix 52 and the transpose of the vector representation of the measured traffic matrix 52.

Turning to FIG. 5D, in some embodiments, step 508—creating a measured link load vector can be accomplished with the following steps, which are not necessarily in order. First, at step 5082, measuring a load on a set of the plurality of links creating a plurality of link load measurements where link loads are linear combinations of unknown network flows 42. Next, at step 5084, forming the measured link load vector from the plurality of link load measurements. After that, at step 5086, transferring the measured link load vector to a network controller 10 that is connected to the computer communications network.

Turning to FIG. 5E, in some embodiments, step 510 creating a vector representation of a measured traffic matrix 52 by measuring and storing a size of a flow from each node to every other node for a specified time period can be accomplished with the following steps which are not necessarily in order. First, at step 5012, installing a set of rules in one of a set consisting of: a storage system, a memory system, or both of one of the set consisting of: network switches, network routers, or both. After that, at step 5014, polling counters in the storage system that create flow-size measurements as flows are measured and network packets are routed. Following that, at step 5016, transferring the measurements into a memory, and the network controller 10.

Figure 6A:
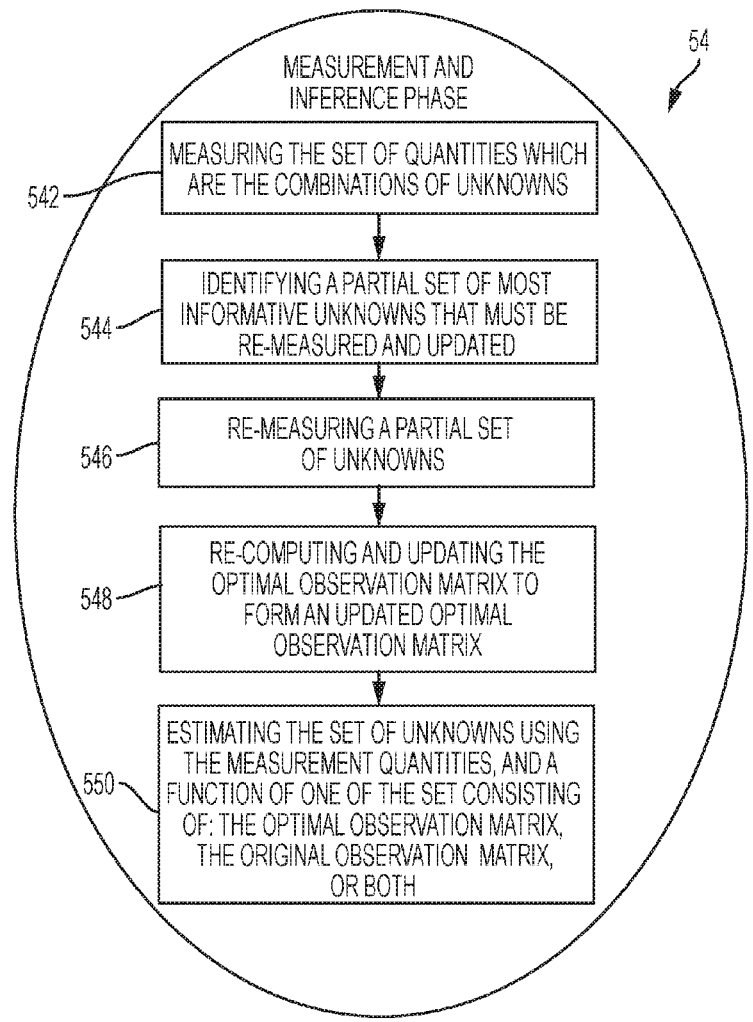
FIG. 6A shows a schematic view of one embodiment of the present invention.

Turning to FIG. 6A, in some embodiments, computer controlled adaptive measurement and inference phase 54 includes the following steps, which are not necessarily in order. First, at step 542, measuring the set of quantities which are the combinations of the unknowns creating measurement quantities. Next, at step 544, identifying a partial set of most informative unknown network flows 42 that must be re-measured and updated. Following that, at step 546, re-measuring a partial set of unknowns. After that at step 548, re-computing and updating the optimal observation matrix 58 to form an updated optimal observation matrix 58. Then, at step 550, estimating the set of unknowns using the measurement quantities, and a function of one of the set consisting of: the optimal observation matrix 58, the original observation matrix, or both.

Figure 6B:
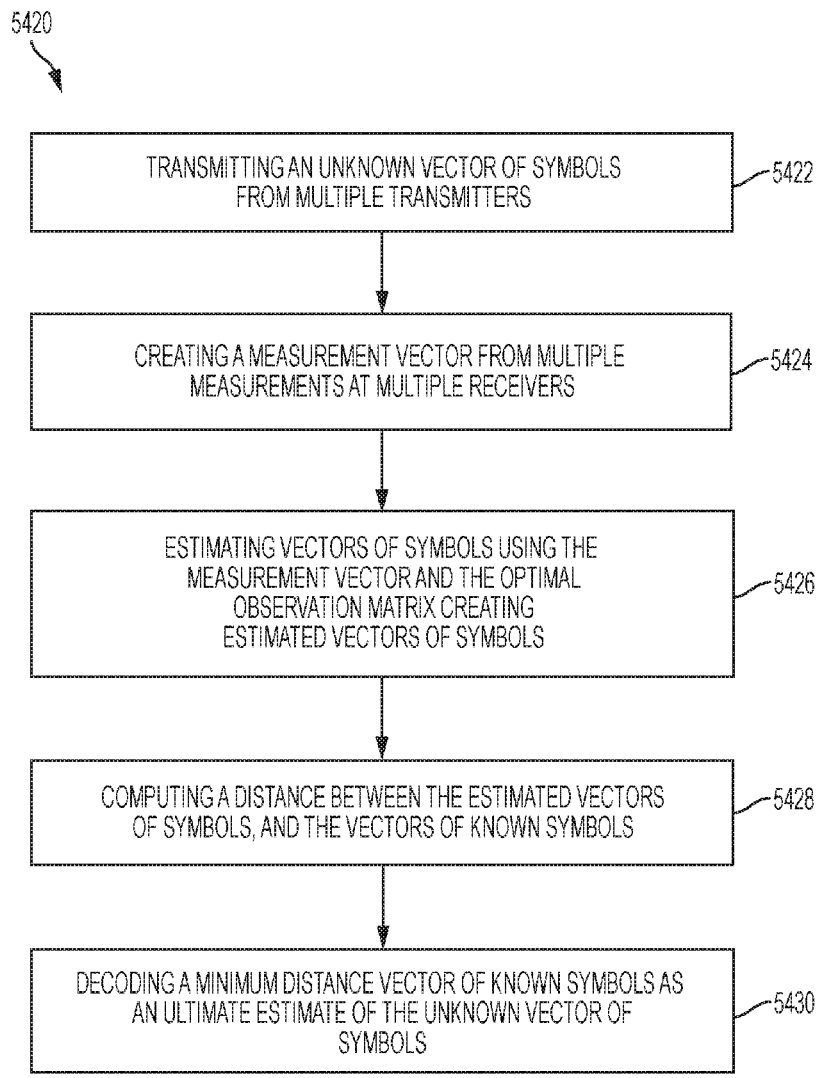
FIG. 6B shows a schematic view of one embodiment of the present invention.

In FIG. 6B, step 5420, in some embodiments, the computer controlled measurement and inference phase 54 includes the following steps, which are not necessarily in order. First, at step 5422, transmitting an unknown vector of symbols from multiple transmitters. Next, at step 5424, creating a measurement vector from multiple measurements at multiple receivers. Following that, at step 5426, estimating vectors of symbols using the measurement vector and the optimal observation matrices creating estimated vectors of symbols. Then, at step 5428, computing a distance between the estimated vectors of symbols, and the vectors of known symbols. After that, at step 5430, decoding a minimum distance vector of known symbols as an ultimate estimate of the unknown vector of symbols.

Figure 6C:
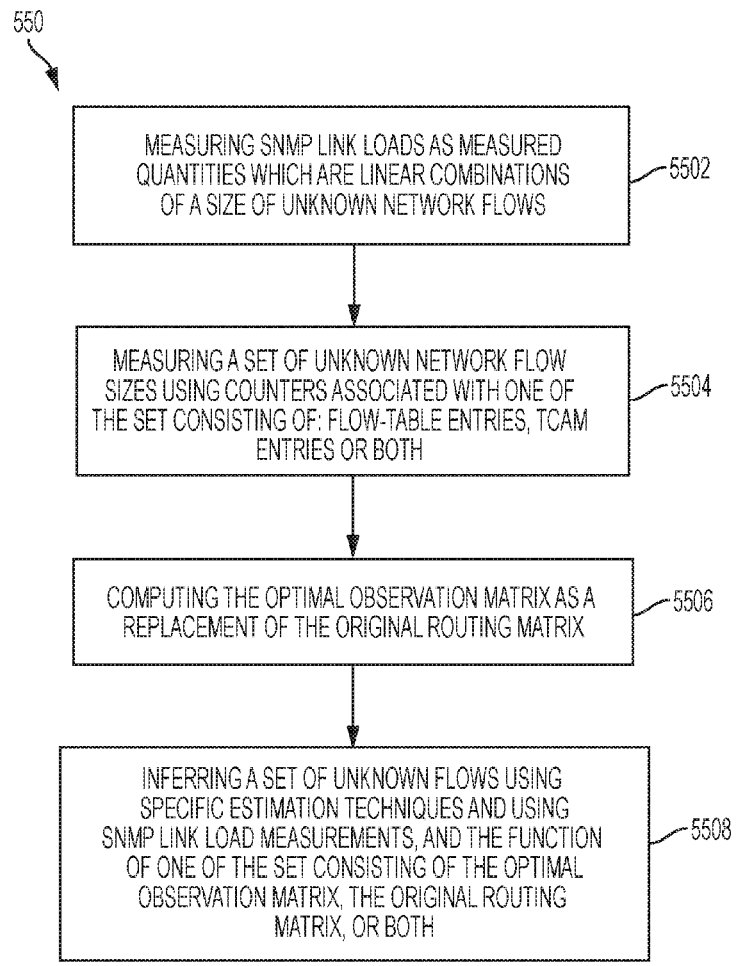
FIG. 6C shows a schematic view of one embodiment of the present invention.

In FIG. 6C, at step 550, estimating the set of unknowns using the measurement quantities, further includes the following steps which are not necessarily in order. First, at step 5502, measuring SNMP link loads as measured quantities which are linear combinations of a size of unknown network flows 42. Then, at step 5504, measuring a set of unknown network flow sizes 30 using counters associated with one of the set consisting of: flow-table entries, TCAM entries or both. After that, at step 5506, computing the optimal observation matrix 58 as a replacement of the original routing matrix. Following that, at step 5508, a set of unknown flows are inferred using specific estimation techniques and using SNMP link load measurements, and the function of one of the set consisting of the optimal observation matrix 58, the original routing matrix, or both.

Figure 6D:
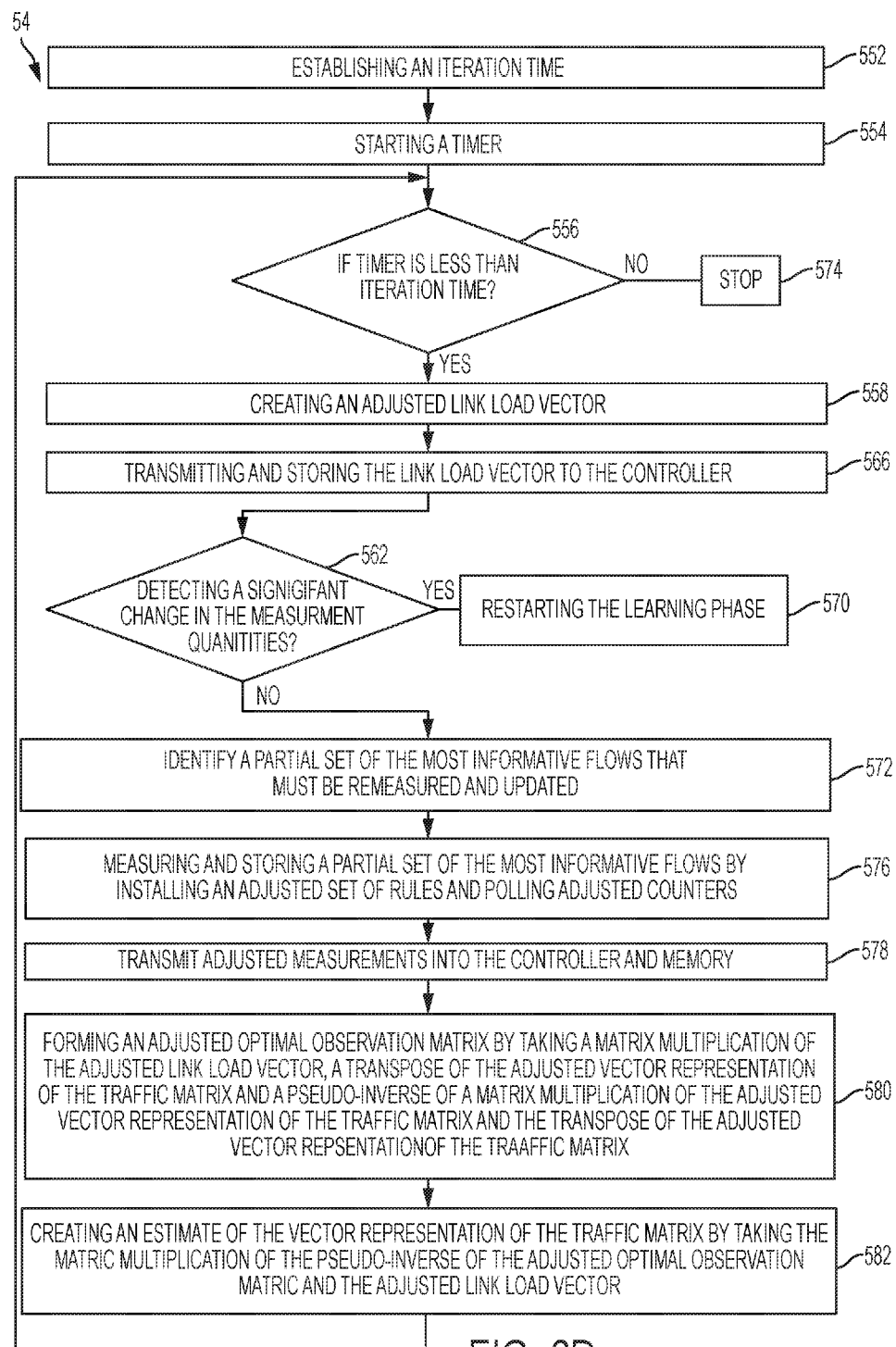
FIG. 6D shows a schematic view of one embodiment of the present invention.

In FIG. 6D, one embodiment of computer controlled measurement and inference phase 54, includes the following steps, which are not necessarily in order. First, at step 552, establishing an iteration time. Next, at step 554, starting a timer. Following that, at step 556, for a timer value less than the iteration time, performing the following steps. If not, then stop the process at step 574.

If the process continues, at step 558, creating an adjusted link load vector. Then, at step 560, transmitting and storing the adjusted link load vector to the controller 10. After that, at step 562, detecting a significant change in the measurement quantities. If so, after that, at step 570, restarting the learning phase 50.

If not, then, at step 572, identifying a partial set of most informative flows 44. Following that, at step 576, measuring and storing a partial set of most informative flows by installing an adjusted set of rules and polling counters. Next, at step 578, transmitting adjusted measurements to the controller 10 and memory. After that at step 580, forming the adjusted optimal observation matrix 58 by taking the matrix multiplication of the adjusted link load vector, the transpose of the adjusted vector representation of the traffic matrix 52, and the pseudo inverse of the matrix multiplication of the adjusted vector representation of the traffic matrix 52 and the transpose of the adjusted vector representation of the traffic matrix 52. Following that, at step 582, creating an estimation of the vector representation of the traffic matrix 52 by taking the matrix multiplication of the pseudo inverse of the adjusted optimal observation matrix 58 and the adjusted link load vector.

Figures 6E, 6F:
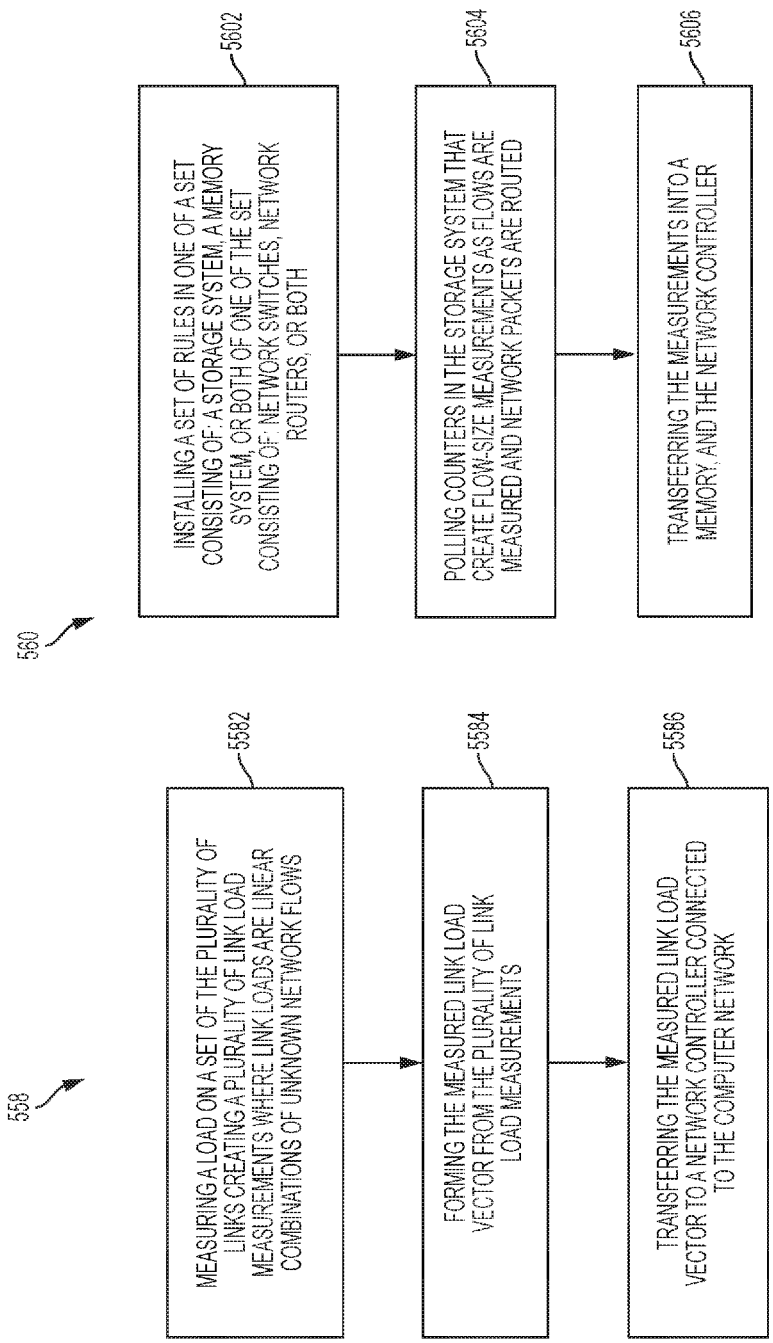
FIG. 6E shows a schematic view of one embodiment of the present invention.
FIG. 6F shows a schematic view of one embodiment of the present invention.

In FIG. 6E, step 558, creating an adjusted link load vector, can include the following steps, which are not necessarily in order. First, at step 5582 measuring a load on a set of the plurality of links creating a plurality of link load measurements where link loads are linear combinations of unknown network flows 42. After that, at step 5584, forming the measured link load vector from the plurality of link load measurements. Following that, at step 5586, transferring the measured link load vector to a network controller 10 connected to the computer network.

In FIG. 6F, step 585, creating the adjusted vector representation of the traffic matrix 52, can be accomplished with the following steps, which are not necessarily in order. First, at step 5822 installing a set of rules in one of a set consisting of: a storage system, a memory system, or both of one of the set consisting of: network switches, network routers, or both. Next, at step 5824, polling counters in the storage system that create flow-size measurements as flows are measured and network packets are routed. After that, at step 5826 transferring the measurements into a memory and the network controller 10.

Figure 7:
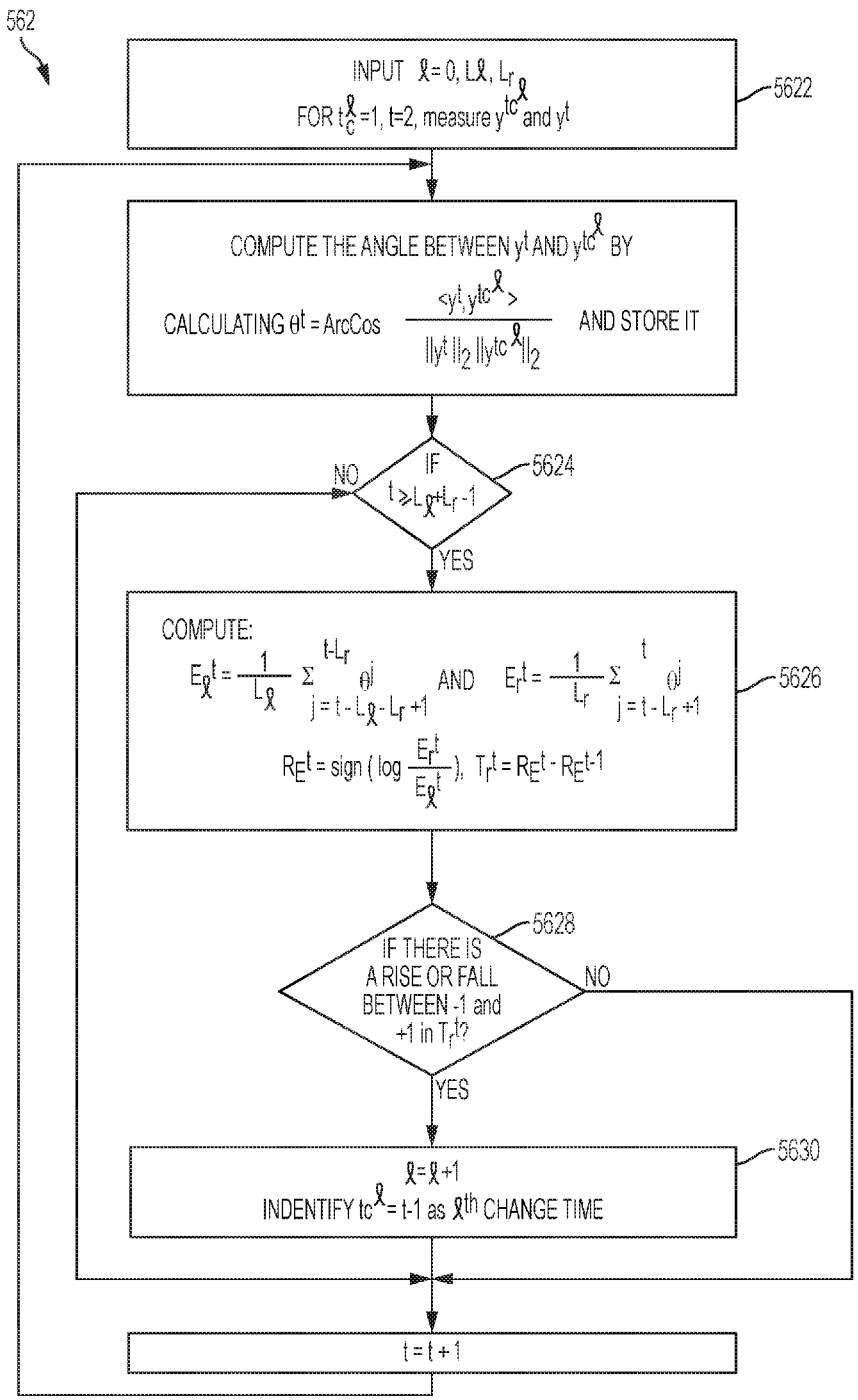
FIG. 7 shows a schematic view of one embodiment of the present invention.

The adaptive per flow measurement module 22 has two main components, the change detection method 46 and adaptive traffic matrix updating method 48. The change in the network traffic is measured by computing the angle between two SNMP link-load vectors, defined in the equation:

$$\theta^t = \arccos \frac{\langle Y^t, Y^{t_c^l}\rangle}{\|Y^t\|_2 \|Y^{t_c^l}\|_2} \text{ where } t \in T_c^l \text{ and } 0 \leq \theta^t \leq \frac{\pi}{2}$$

Where $Y^t$ and $Y^{t_c^l}$ denote the SNMP link-load vectors at the beginning of the $l^{th}$ coherence time and at the current time t, respectively. That is, $\theta^t$ quantifies the deviation of two SNMP link-load vectors at two different times $Y^t$ and $Y^{t_c^l}$ as an indication of a major change in the network traffics. Accordingly and to have a causal change detection method, at any time t, the average of $\theta^t$'s over two periods of time, determined by two windows $w_l^t$ and $w_r^t$ with lengths $L_l$ and $L_r$, is compared where $w_l^t:=\{t-L_l-L_r+1, \ldots, t-L_r\}$ and $w_r^t:=\{t-L_r+1, \ldots, t\}$. The transition between two consecutive relative comparisons is reported as a change time $t_c^l$. Turning to FIG. 7, The pseudo-code of this process step 562, detecting a significant change in the measurement quantities is as follows:

Input: $\theta=\{\theta^t\}_{t=1}^t$, $w_l^t$, $w_r^t$ at step 5622
Output: The set of detected change times $S_c^t:=\{t_c^1, t_c^2, \ldots\}$
Initialization: l=0, $S_c^t=\emptyset$
While $t>L_l+L_r+1$ do at step 5624

$$E_l^t = \frac{1}{L_l} \sum_{j=t-L_l-L_r+1}^{t-L_r} \theta^j, E_r^t = \frac{1}{L_r} \sum_{j=t-L_r+1}^{t} \theta^j \text{ and}$$

$$R_E^t = \text{sign}\left(\log \frac{E_r^t}{E_l^t}\right), T_r^t = R_E^t - R_E^{t-1} \text{ at step } 5626$$

If there is a rise or fall between −1 and +1 in $T_r^t$ at step 5628 then
l=l+1, $t_c^l$=t−1, $S_c^t(l)=t_c^l$ at step 5630
End if
End while This method is not based on any statistical assumption about $\theta_t$, and thus, a more change detection method 46 can be used to enhance its performance. Without loss of generality and to simplify the current worst-case implementation of the change detection method 46, $\theta_t$ is computed as the angle between $Y_t$ and $Y_1$ for $t \in [2, \ldots, T_0]$ where $T_0$ is the duration of traffic in each data set.

Figure 8:
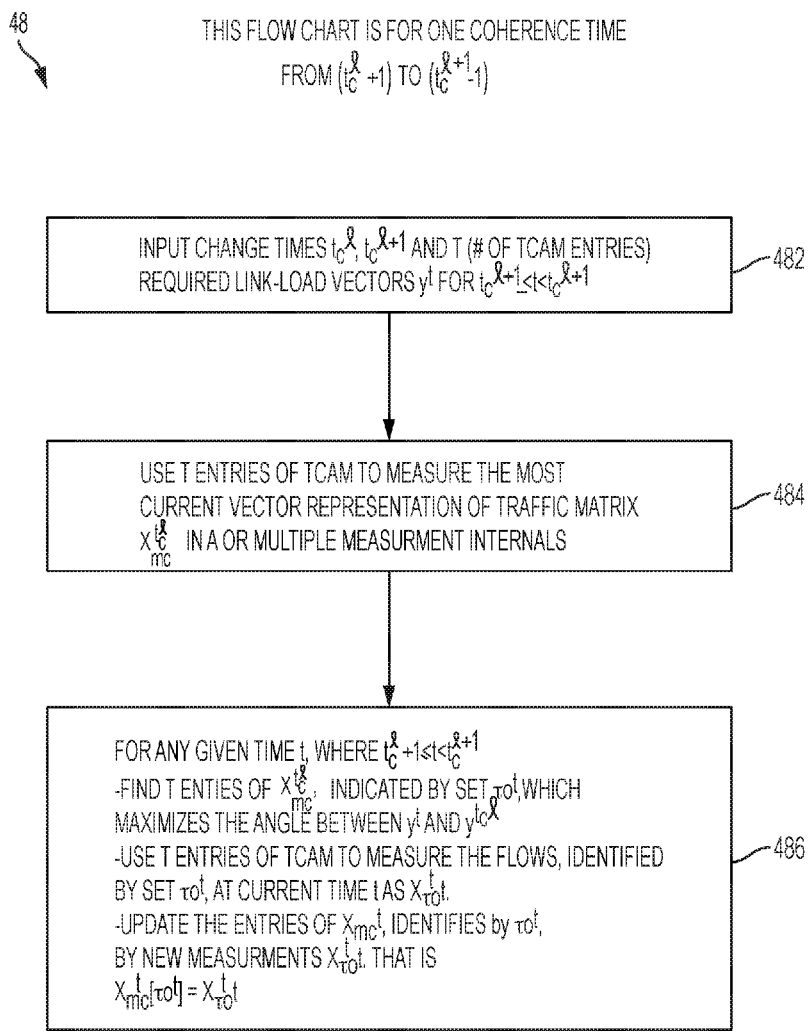
FIG. 8 shows a schematic view of one embodiment of the present invention.

Turning to FIG. 8, to adaptively update the most current traffic matrix 62 or $X_{mc}^t$, which is required for the optimal-coherent inference module 24, the flexibility of the software defined measurement network 12 is used to allocate the limited available ternary content addressable memory 26 entries for measuring the most informative flows 44 that leads to the best possible estimation accuracy using the optimal-coherent inference module 24. The following method summarizes the adaptive traffic matrix updating method 48 where by detecting the $l^{th}$ change time $t_c^l$ all T entries of ternary content addressable memory 26 are used to measure the $X_{mc}^t(:=X^{t_c^l})$ in one or more $$\lceil \frac{n}{T} \rceil$$

measurement epochs; in this case, $\tau 0^t = \{1, \ldots, n\}$ and $|\tau 0^t|=n$.

Figure 9:
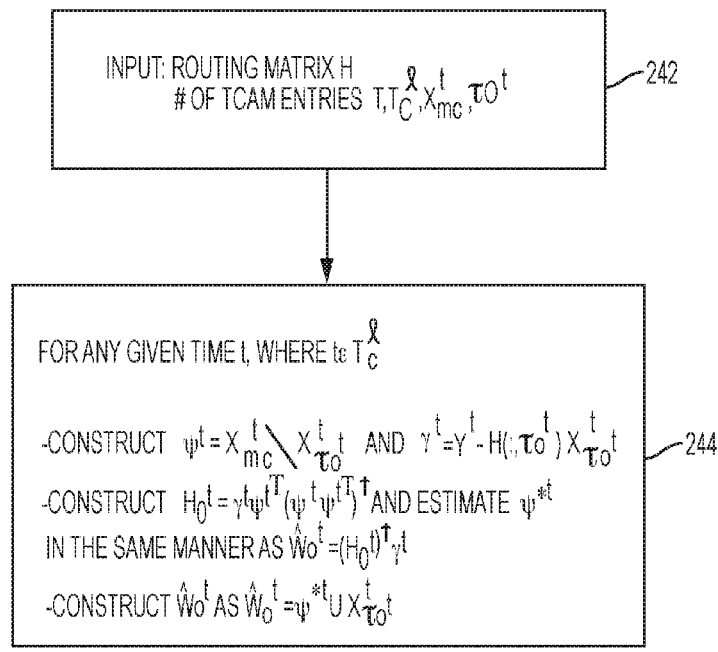
FIG. 9 shows a schematic view of one embodiment of the present invention.

Input: number of TCAM entries T, $l^{th}$ change time $t_c^l$, $(l+1)^{th}$ change time $t_c^{l+1}$ at step 472
Output: At each epoch t, the updated traffic matrix 52 or $X_{mc}^t$ and $\tau 0^t$
Initialization: Use T entries of TCAM to measure $X_{mc}^t:=X_{mc}^{t_c^l}$ at step 484
While $t_c^l+1 \leq t \leq t_c^{l+1}$, do at step 486
Find T entries of the updated traffic matrix 52 or $X_{mc}^t$ indicated by the set $\tau 0^t$, which maximizes the angle between $Y^t$ and $Y^{t_c^l}$.
Use T entries of the TCAM to measure the indicated flows at the current time t as $X_{\tau 0^t}^t$
$X_{mc}^t[\tau 0^t]=X_{\tau 0^t}^t$, which in MATLAB language means replacing all elements of $X_{mc}^t$ with indices in the set $\tau 0^t$ by $X_{\tau 0^t}^t$.
End while As shown in FIG. 9, for $t_c^l+1 \leq t \leq t_c^{l+1}$ the T flows 42 which maximize $\theta_t$ are directly measured. These per flow measurements 34 have the most contribution in equalizing/coinciding the two SNMP link-load vectors $Y^t$ and $Y^{t_c^l}$; in this case, $\tau 0^t=\{i_1, \ldots i_j, \ldots, i_T\}$ where $i_j \in \{1, \ldots, n\}$ and $|\tau 0^t|=T$. Accordingly, at each epoch t, also, T elements of traffic matrix 52 vector $X_{mc}^t$ are updated by the recently measured flows 42. The following process represents the main steps in implementing the optimal-coherent inference module 24 in a sample coherence time $T_c^l$.

Input: Routing matrix H, # of TCAM entries T, $T_c^l$, $X_{mc}^t$, $\tau 0^t$ at step 242
Output: $\hat{W}_o^t$ for $t \in T_c^l$
For t from $(t_c^l+1)$ to $(t_c^{l+1}-1)$ with step size +1, do at step 244
$\Psi^t = X_{mc}^t \backslash X_{\tau 0^t}^t$ and $\Upsilon^t = Y^t - H(:, \tau 0^t) X_{\tau 0^t}^t$ where operator : is the colon operator in MATLAB language and it means all rows, and $H(:, \tau 0^t)$ denotes a sub-matrix of H constructing from all rows of H with columns identified by the set $\tau 0^t$.
$H_o^t = \Upsilon^t \Psi^{t\dagger}(\Psi^t \Psi^{t\dagger})^\dagger$ and estimate $\Psi^{*t}$ in the same manner as $\hat{W}_{o\bar{\tau}}^t=(H_o^t)^\dagger \Upsilon^t$.
$\hat{W}_o^t=\Psi^{*t} \cup X_{\tau 0^t}^t$
End for Here, to make the best use of the most-current $X_{mc}^t$, first, optimal-coherent inference module 24 cancels out the direct per-flow statistics 52, which have been accurately measured, and provide the required $\Upsilon^t$ and $\Psi^t$ for optimal-coherent inference module 24. Then, the optimal observation matrix 58 of SNMP link-loads $H_o^t$ is computed. Finally, the minimum-norm solution $\Psi^{*t}$ is estimated and traffic matrix 52 or $\hat{W}_o^t$ at time t is constructed.

In all algorithms, the matrix and vector manipulations are match with the syntax of the commands of MATLAB language.

FIG. 8 and FIG. 9 represent the flowchart of algorithms in $l^{th}$ coherence time $T_c^l$ from $(T_c^l+1)$ to $(T_c^{l+1}-1)$, that is, $T_c^l=\{t_c^l+1, \ldots, t_c^{l+1}-1\}$.

Figure 10:
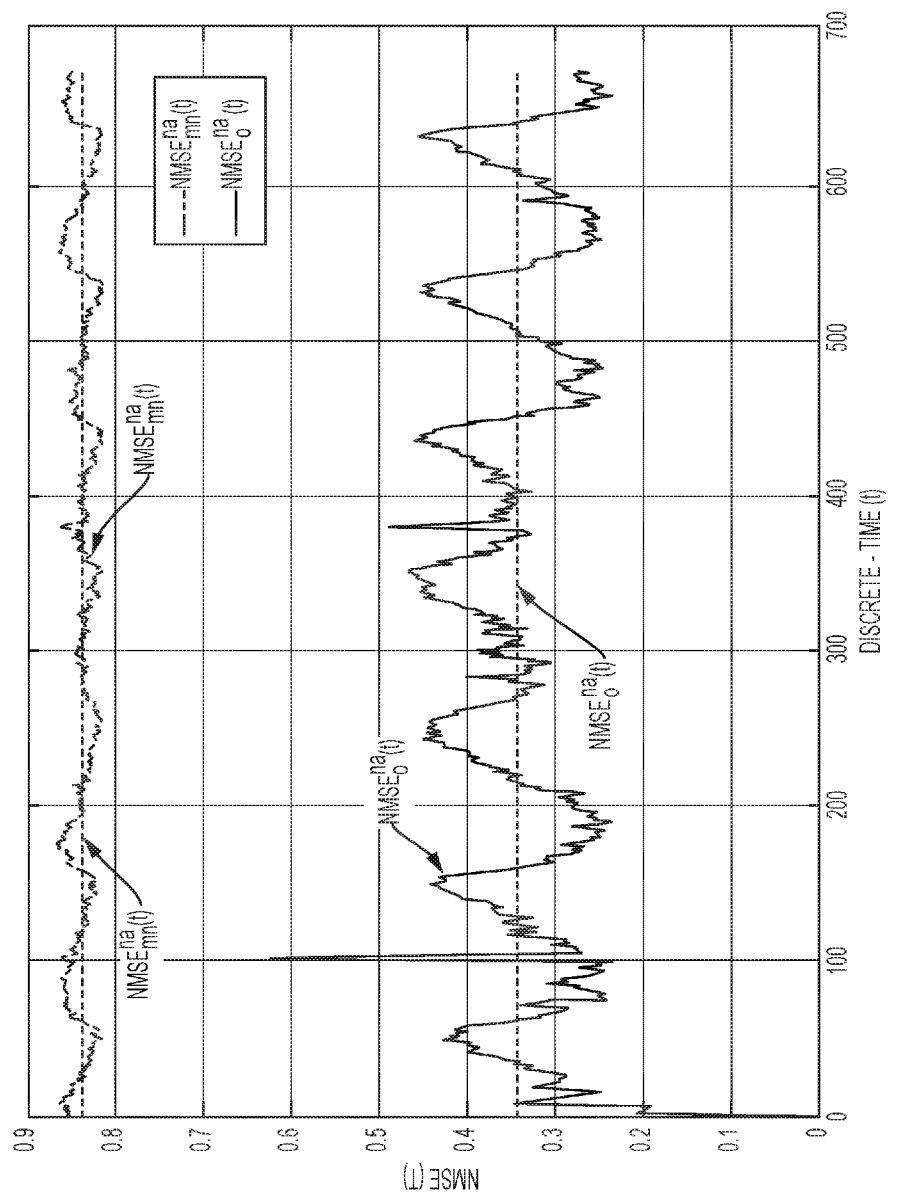
FIG. 10 shows a graphical output of one embodiment of the present invention.
Figure 11:
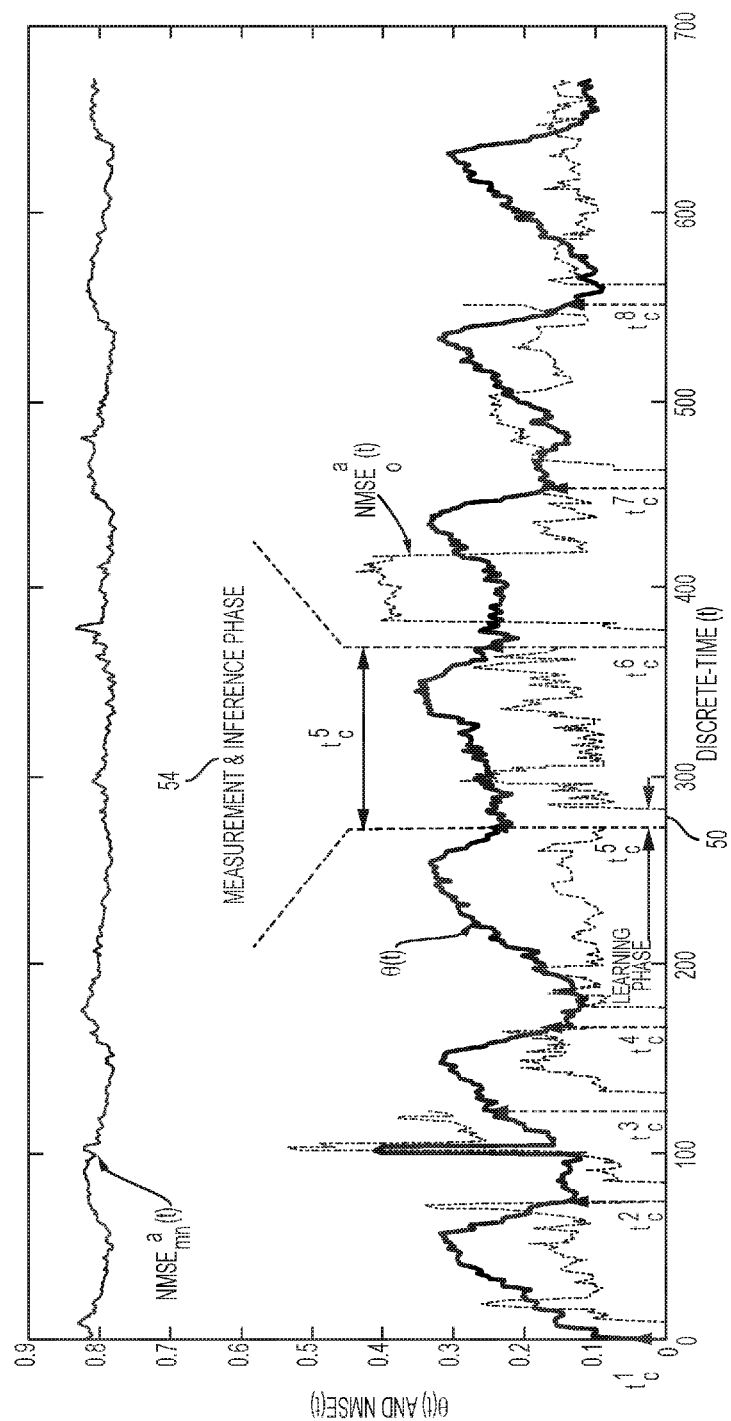
FIG. 11 shows a graphical output of one embodiment of the present invention.

FIG. 10 and FIG. 11 show the effectiveness of embodiments of the disclosed invention with real traffic traces from Geant network considered. FIG. 10 shows the performance of a non-adaptive case which is a special case of the adaptive case with only one learning phase in the beginning. FIG. 11 shows the performance of an adaptive case where there are multiple learning phases at the important time of the detection of significant changes.

The framework below provides different metrics for evaluating the performance of the network controller 10.

$$NMSE = \frac{1}{T_0} \sum_{t=1}^{T_0} NMSE(t) \text{ where } NMSE(t) := \frac{\|X^t - \hat{W}_o^t\|_2}{\|X^t\|_2}$$

NMSE denotes normalized mean squared error and measures the accuracy of flow size estimation technique. Accordingly, $NMSE_{mn}$ denotes the error using the regular minimum norm estimation method where $X_{mn}{}^t = H^\dagger Y^t = (H^T(HH^T)^{-1})Y^t$, and $NMSE_O$ denotes the estimation error using the optimal-coherent inference module 24. The $NMSE_{mn}{}^a$, $NMSE_O{}^a$ denote the NMSE in the adaptive case, and $NMSE_{mn}{}^{na}$ and $NMSE_O{}^{na}$ denote the NMSE in non-adaptive case.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A method for solving an under-determined inverse problem or network inference/tomography problem in per-flow size, delay, loss and throughput inference in a computer network, through a system; given an original observation matrix, the method comprising:
    (a) establishing the computer network having a plurality of nodes wherein the per-flow size, the delay, the loss and the throughput inferences are unknown; wherein an original routing matrix determines a contribution of each flow size on each link-load;
    (b) performing a learning phase by:
        (1) measuring a set of quantities which are combinations of unknowns creating a first set of measurements;
        (2) measuring at least some of a set of unknowns creating a second set of measurements;
        (3) using functions of the first set of measurements and functions of the second set of measurements, computing an optimal observation matrix or pseudo-optimal observation matrix;
    (c) performing a computer controlled adaptive measurement and inference phase by:
        (1) measuring the set of quantities which are the combinations of the unknowns creating measurement quantities;
        (2) identifying a partial set of most informative unknown network flows that must be re-measured and updated;
        (3) re-measuring a partial set of unknowns;
        (4) re-computing and updating the optimal observation matrix to form an updated optimal observation matrix;
        (5) estimating the set of unknowns using the measurement quantities, and a function of one of the set consisting of: the optimal observation matrix, the original observation matrix, or both;
    wherein, the under-determined inverse problem is a traffic matrix estimation problem and a set of unknown network flows are estimated by:
        a) measuring SNMP link loads as measured quantities which are linear combinations of a size of unknown network flows;
        b) measuring a set of unknown network flow sizes using counters associated with one of the set consisting of: flow-table entries, TCAM entries or both;
        c) computing the optimal observation matrix as a replacement of the original routing matrix; and
        d) inferring a set of unknown flows using specific estimation techniques and using SNMP link load measurements, and the function of one of the set consisting of the optimal observation matrix, the original routing matrix, or both.

2. The method of claim 1, further comprising: (d) determining a starting time of the learning phase and a duration of the learning phase by detecting sequential significant changes in measurements during the computer controlled adaptive measurement and inference phase.

3. The method of claim 1, further comprising: (f) determining the set of most informative unknown network flows using at least one learning algorithm; wherein the at least one learning algorithm includes a multi-bandit algorithm.

4. The method of claim 1, further comprising generating the optimal observation matrix using one of the set consisting of:
   (a) a regularized optimization technique including a least square estimation technique with constraints; and
   (b) the regularized optimization technique including the least square estimation technique without the constraints.

5. The method of claim 1, further comprising generating the optimal observation matrix using one of the set consisting of:
   (a) a non-regularized optimization technique including a least square estimation technique with constraints; and
   (b) the non-regularized optimization technique including the least square estimation technique without the constraints.

6. The method of claim 1, generating an estimation of unknowns using a specified estimation technique using one of the set consisting of:
   (a) a regularized optimization technique including a least square estimation technique with constraints; and
   (b) the regularized optimization technique including the least square estimation technique without the constraints.

7. The method of claim 1, generating an estimation of unknowns using a specified estimation technique using one of the set consisting of:
   (a) a non-regularized optimization technique including a least square estimation technique with constraints; and
   (b) the non-regularized optimization technique including the least square estimation technique without the constraints.

8. The method of claim 1, wherein, measurements of the set of unknowns, in both learning phase and computer controlled adaptive measurement and inference phases, are approximated using: 1) mathematical, statistical, heuristic and experimental models, 2) auxiliary information, and 3) information from network topology, distance between nodes, the size of queues, buffers in nodes, and any combination of these.

9. The method of claim 1, wherein, a function of the optimal observation matrix is used for routing a set of network flows.

10. The method of claim 1, wherein, in the learning phase, several vectors of measurement quantities and unknown attributes of interest are available, and the optimal observation matrix or pseudo-optimal observation matrix is calculated using a least mean squares algorithm; wherein, in the computer controlled adaptive measurement and inference phase, a set of new measurements are provided using a function of the optimal observation matrix; wherein the unknowns of interest is estimated using a specific estimation technique.

11. The method of claim 1,
    wherein, the under-determined inverse problem is constructed by converting one of the set consisting of: a square inverse problem, over-determined inverse problem or both to an under-determined inverse problem,
    wherein, the optimal observation matrix is computed and used for the estimation of unknowns of interest in one of the set consisting of: a square inverse problem, an over-determined inverse problem or both.

12. The method of claim 1, wherein, the under-determined inverse problem is a system identification in the under-determined multi-input and multi-output systems, and a realization of parameters of a model of the system are estimated by computing an optimal observation matrix.

13. The method of claim 12, wherein, the system is an under-determined multi-input and multi-output communication system wherein:
    a) in the learning phase, for all possible vectors of communication symbols, the optimal observation matrix is computed as follows:
       1) transmitting a vector of known symbols at multiple transmitters;
       2) measuring the vector of known symbols at multiple receivers; creating vectors of measurements;
       3) computing the optimal observation matrix for each vector of known symbols and a corresponding vector of measurements, creating a plurality of optimal observation matrixes;
       4) saving the vector of known symbols and the plurality of optimal observation matrixes at a receiver device;
    b) in the computer controlled adaptive measurement and inference phase:
       1) transmitting an unknown vector of symbols from multiple transmitters;
       2) creating a measurement vector from multiple measurements at multiple receivers;
       3) estimating vectors of symbols using the measurement vector and all optimal observation matrices creating estimated vectors of symbols;
       4) computing a distance between the estimated vectors of symbols, and the vectors of known symbols;
       5) decoding a minimum distance vector of known symbols as an ultimate estimate of the unknown vector of symbols.

14. A system useful for displaying a solution to an under-determined inverse problem in per-flow size, delay, loss and throughput inference in a computer network; the system comprising:
    (a) the computer network having a plurality of nodes where the per-flow size, the delay, the loss and throughput estimates inference are unknown;
    (b) a computer store configured to store data for at least two or more nodes;
    (c) a display configured to display the per-flow size, the delay, the loss and throughput estimates in the computer network;
    (d) a computer controller connected to each of the plurality of nodes, wherein the computer controller is coupled to the computer store and programmed to:
       (1) perform a learning phase by:
          (i) measuring a set of quantities which are combinations of unknowns creating a first set of measurements;
          (ii) measuring at least some of a set of unknowns creating a second set of measurements;
          (iii) using functions of the first set of measurements and functions of the second set of measurements, and computing an optimal or pseudo-optimal observation matrix;
       (2) perform an adaptive measurement and inference phase by:
          (i) measuring the set of quantities which are the combinations of the unknowns creating measurement quantities;
          (ii) identifying a partial set of most informative unknown network flows that must be re-measured and updated;
          (iii) re-measuring the partial set of most informative unknown network flows;

(iv) re-computing and updating an optimal observation matrix to form an updated optimal observation matrix;
(v) estimating the set of unknowns using the measurement quantities, and a function of one of the set consisting of: the optimal observation matrix, an original observation matrix, or both; and
(3) display the unknowns;
wherein, the under-determined inverse problem is a traffic matrix estimation problem and a set of unknown network flows are estimated by:
a) measuring SNMP link loads as measured quantities which are linear combinations of a size of unknown network flows;
b) measuring a set of unknown network flow sizes using counters associated with one of the set consisting of: flow-table entries, TCAM entries or both;
c) computing the optimal observation matrix as a replacement of the original routing matrix; and
d) inferring a set of unknown flows using specific estimation techniques and using SNMP link load measurements, and the function of one of the set consisting of the optimal observation matrix, the original routing matrix, or both.

15. A computer-readable memory adapted for use by a computer network in determining a solution to an under-determined inverse problem in per-flow size, delay, and throughput inference, the computer-readable memory used to direct a computer of the network to perform the steps of:
(a) the computer network having a plurality of nodes where the per-flow size, the delay, the loss and throughput estimates inference are unknown;
(b) a computer store configured to store data for at least two or more nodes;
(c) a display configured to display the per-flow size, the delay, the loss and throughput estimates in the computer network;
(d) a computer controller connected to each of the plurality of nodes, wherein the computer controller is coupled to the computer store and programmed to:
(1) perform a learning phase by:
(i) measure a set of quantities which are combinations of unknowns creating a first set of measurements;
(ii) measure at least some of a set of unknowns creating a second set of measurements;
(iii) use functions of the first set of measurements and functions of the second set of measurements, and computing an optimal or pseudo-optimal observation matrix;
(2) perform an adaptive measurement and inference phase by:
(i) measuring the set of quantities which are the combinations of the unknowns creating measurement quantities;
(ii) identifying a partial set of most informative unknown network flows that must be re-measured and updated;
(iii) re-measuring a partial set of most informative unknowns;
(iv) re-computing and updating an optimal observation matrix to form an updated optimal observation matrix;
(v) estimating the set of unknowns using the measurement quantities, and a function of one of the set consisting of: the optimal observation matrix, an original observation matrix, or both; and
(3) display the unknowns;
wherein, the under-determined inverse problem is a traffic matrix estimation problem and a set of unknown network flows are estimated by:
a) measuring SNMP link loads as measured quantities which are linear combinations of a size of unknown network flows;
b) measuring a set of unknown network flow sizes using counters associated with one of the set consisting of: flow-table entries, TCAM entries or both;
c) computing the optimal observation matrix as a replacement of the original routing matrix; and
d) inferring a set of unknown flows using specific estimation techniques and using SNMP link load measurements, and the function of one of the set consisting of the optimal observation matrix, the original routing matrix, or both.

\* \* \* \* \*